United States Patent
Kouns

(10) Patent No.: US 7,027,680 B2
(45) Date of Patent: Apr. 11, 2006

(54) SWITCH/VARIABLE OPTICAL ATTENUATOR (SVOA)

(75) Inventor: Heath Kouns, Pearsiburg, VA (US)

(73) Assignee: Moog Components Group Inc., East Aurora, NY (US)

( * ) Notice: Subject to any disclaimer, the term of this patent is extended or adjusted under 35 U.S.C. 154(b) by 59 days.

(21) Appl. No.: 10/371,184

(22) Filed: Feb. 24, 2003

(65) Prior Publication Data

US 2004/0165813 A1    Aug. 26, 2004

(51) Int. Cl.
*G02B 6/26* (2006.01)
*G02B 6/42* (2006.01)

(52) U.S. Cl. ............... 385/16; 385/17; 385/18; 385/24; 385/140

(58) Field of Classification Search ........... 385/16–18, 385/24, 140
See application file for complete search history.

(56) References Cited

U.S. PATENT DOCUMENTS

| | | | |
|---|---|---|---|
| 6,404,969 B1* | 6/2002 | Tayebati et al. | 385/140 |
| 6,591,032 B1* | 7/2003 | Tayebati et al. | 385/18 |
| 6,782,185 B1* | 8/2004 | Katayama et al. | 385/140 |
| 6,847,753 B1* | 1/2005 | Abu-Ageel | 385/18 |
| 6,947,656 B1* | 9/2005 | Kim et al. | 385/140 |
| 2002/0131712 A1* | 9/2002 | Markwardt et al. | 385/40 |
| 2002/0136496 A1* | 9/2002 | Eldada | 385/39 |
| 2003/0113067 A1* | 6/2003 | Koh et al. | 385/48 |
| 2003/0210855 A1* | 11/2003 | Sakuma et al. | 385/21 |
| 2004/0136680 A1* | 7/2004 | Medina et al. | 385/140 |

* cited by examiner

*Primary Examiner*—Juliana Kang
*Assistant Examiner*—Daniel Petkovsek
(74) *Attorney, Agent, or Firm*—Phillips Lytle LLP

(57) ABSTRACT

A Switch/Variable Optical Attenuator (SVOA) includes a die including at least one 2×2 optical switch and a respective integral variable optical attenuator for each of the at least one 2×2 optical switch. Each of the at least one 2×2 optical switches includes an INPUT optical port, an OUTPUT optical port, an ADD optical port, and a DROP optical port. The INPUT optical port is connected to the OUTPUT optical port in one state of the switch, and the ADD optical port is connected to the OUTPUT optical port in a second state of the switch. A single air gap exists between the ports. The VOA is mounted on the die and is associated with the switch for selectively attenuating optical signals transiting the air gap from one port to another.

12 Claims, 9 Drawing Sheets

SWITCH/VARIABLE OPTICAL ATTENUATOR (SVOA)

RELATED APPLICATIONS

The present application is related to U.S. patent application Ser. No. 09/794,773, filed Feb. 27, 2001, entitled "Bi-stable Micro-actuator and Optical Switch", and that application is hereby incorporated by reference in its entirety into the present specification. Any document incorporated by reference into application Ser. No. 09/794,773 is also hereby incorporated into the present specification.

BACKGROUND OF THE INVENTION

1. Field of the Invention

The present invention relates generally to optical switches and variable optical attenuators, and, more particularly, to a Switch/Variable Optical Attenuator ("SVOA") including an integrated Micro-Electro-Mechanical System ("MEMS") optical switch and MEMS Variable Optical Attenuator ("VOA").

2. Description of the Related Art

In the past few years, the demand for telecommunications services has increased the bandwidth requirements placed on the major carriers. Accordingly, these major carriers have had to add equipment to handle the increased load. This increases the total board space needed for such equipment, thereby resulting in a need for a reduced product footprint; that is, it would be advantageous to decrease the size of the needed equipment. One method used to decrease equipment size is to develop new-technology products that are inherently smaller and more compact. For example, the industry standard in small-part-count optical switches had been opto-mechanical actuators. These opto-mechanical actuators are being replaced by new devices, based on MEMS technology, that are smaller in size and more reliable.

Integrating several functions into the same package can also effect a size reduction. Unlike electrical components, in which the electrical connections are obtained simply by soldering the components into a circuit board, optical components have fibers that must be connected either by attaching connectors at the ends of the fibers or by fusion spicing the fibers together. Also, room must be left to coil or wrap any extra fiber in such a way that it will not be damaged or kinked. This effectively increases the required board space for each component. Eliminating the fiber and the connection between two components, and integrating the components into a common enclosure, can save board space. A good example of this concept is the technology of planar waveguides. By providing waveguide patterns on a substrate material, various functions can be realized on the same chip.

The advantages of planar waveguide devices do not come without drawbacks. For example, optical switches using planar waveguides tend to be slower and more lossy than MEMS devices. Although the MEMS devices have better performance characteristics, they are generally considered more difficult to integrate. MEMS devices typically depend on free space propagation and mirrors to change the light path. Thus, MEMS devices are limited in the number of functions that can be integrated into a given space. Ideally, it would be desirable to have a device that has the performance characteristics of MEMS devices and the integration factor of planar waveguides.

In the expanding telecommunication field, several combinations of components are becoming standardized. One such combination is the Reconfigurable Optical Add Drop Multiplexer ("ROADM"), illustrated in FIG. 1. ROADMs are being used in almost every node of major optical networks, and will find more uses in other applications, such as inter-office networks.

As illustrated in FIG. 1, a multiplexed optical input signal IN is inputted to an optical demultiplexer 100 where it is demultiplexed into sixteen optical signals, for example. The sixteen optical signals are respectively inputted to sixteen optical switches, indicated at 120, whose respective outputs are provided via respective Variable Optical Attenuators (VOAs) 130 to an optical multiplexer 140. The output of the optical multiplexer 140 is inputted to an optical splitter 150 having one output, OUT, which is the output of the ROADM, and having another output which is inputted to an Optical Channel Monitor (OCM) 160 having Voltage Outputs that may be used for monitoring purposes, these Voltage Outputs reflecting the characteristics of the optical signal inputted to the OCM 160 from the optical splitter 150.

One technique for implementing the ROADM illustrated in FIG. 1 is to use arrayed waveguides for the multiplexer 140 and demultiplexer 100, and to use commercially-available MEMS devices for the switches 120 and the VOAs 130.

The add/drop function of the ROADM is usually performed with a 2×2 switch 220, as illustrated in FIG. 2. Such a 2×2 switch 220 has an Inserted State and a Bypass State. In the Bypass State, the input In is connected to the output Out. In the Inserted State, the ADD input is connected to the OUT output while the input IN is connected to the DROP output. Thus, an incoming signal can either be allowed to pass through, or be dropped out and a new signal inserted in its place. In either case, fluctuations occur in the signal power, and the added signal almost never has the same signal power level as the incoming signal. Accordingly, it is necessary to equalize and level the signal power level. This may be effected by connecting a VOA 130 between the output of the switch 220 and the multiplexer 140 (not shown in FIG. 2). Unfortunately, a connector or fusion splice 210 must be provided between the switch 220 and the VOA 130.

If the switch 220 and VOA 130 of FIG. 2 could be combined, the combination thereof would be simplified by eliminating one package and one connector or splice, and the resulting combination would have a reduced footprint and reduced assembly time, as well as improved reliability. On the manufacturing side, the integration of these two devices would eliminate four fiber end-face preparations and would eliminate one entire device packaging process.

SUMMARY OF THE INVENTION

In view of the above, it is an object of the present invention to provide a Switch/Variable Optical Attenuator (SVOA) by integrating a MEMS Optical Switch and a MEMS Variable Optical Attenuator (VOA).

These and other objects may be effected by providing a Switch/Variable Optical Attenuator (SVOA) including: a die including at least one 2×2 optical switch and a respective integral variable optical attenuator for each 2×2 optical switches. Each 2×2 optical switch includes an INPUT optical port, an OUTPUT optical port, an ADD optical port, and a DROP optical port. The INPUT optical port is connected to the OUTPUT optical port in one state of the associated optical switch, and the ADD optical port being connected to the OUTPUT optical port in a second state of the associated optical switch. A single air gap exists between the ports. The VOA is mounted on the die and is associated with the switch for selectively attenuating optical signals transiting the air gap from one port to another.

In the SVOA described above, there may be n 2×2 optical switches and respective integral variable optical attenuators, n being an integer greater than 1. Each optical switch may be an Optical Micro-Electro-Mechanical System (MEMS) Switch.

Furthermore, in the SVOA described above, each respective variable optical attenuator may include a MEMS variable optical attenuator.

The foregoing, and a better understanding of the present invention, will become apparent from the following detailed description of an example embodiment and the claims when read in connection with the accompanying drawings, all forming a part of the disclosure of this invention. While the foregoing and following written and illustrated disclosure focuses on disclosing an example embodiment of the invention, it should be clearly understood that the same is by way of illustration and example only and that the invention is not limited thereto. This spirit and scope of the present invention are limited only by the terms of the appended claims.

DETAILED DESCRIPTION

Figure 1:
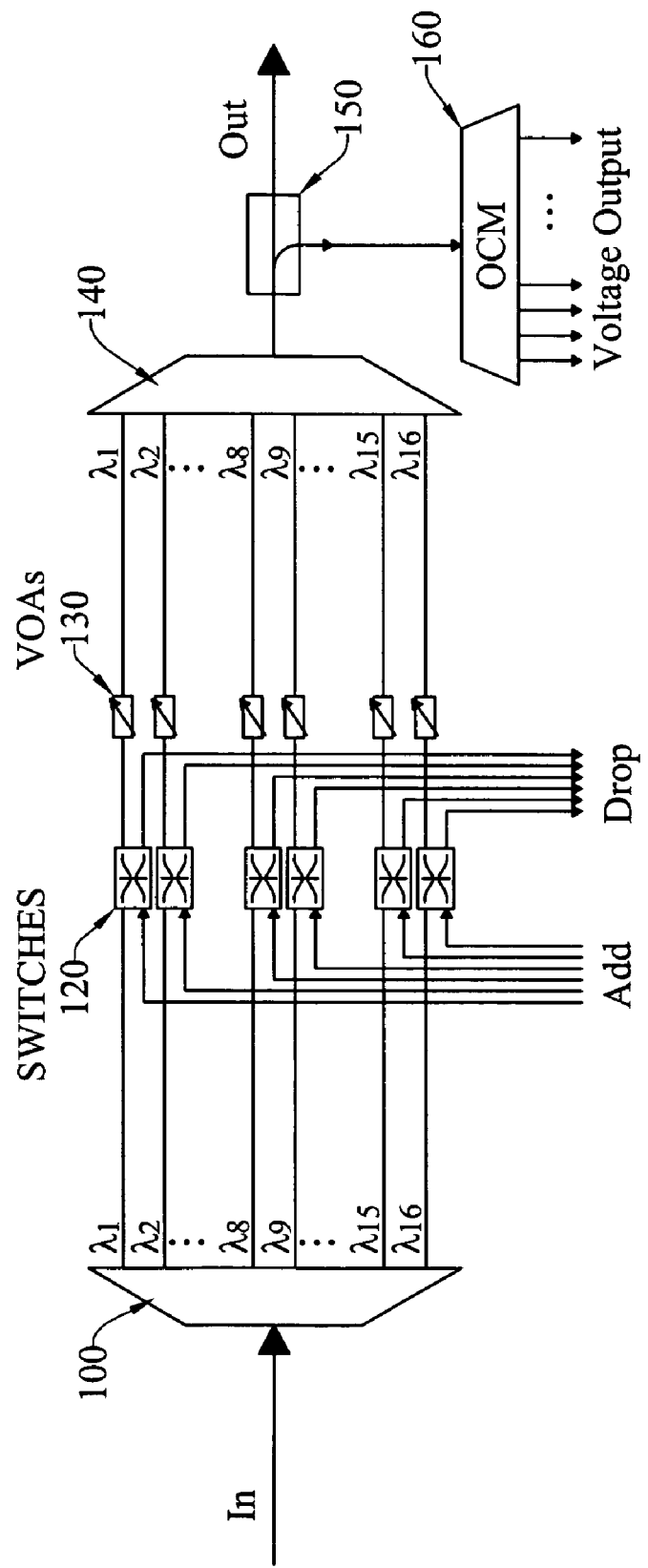
FIG. 1 is a block diagram illustrating ROADM topology.
Figure 2:
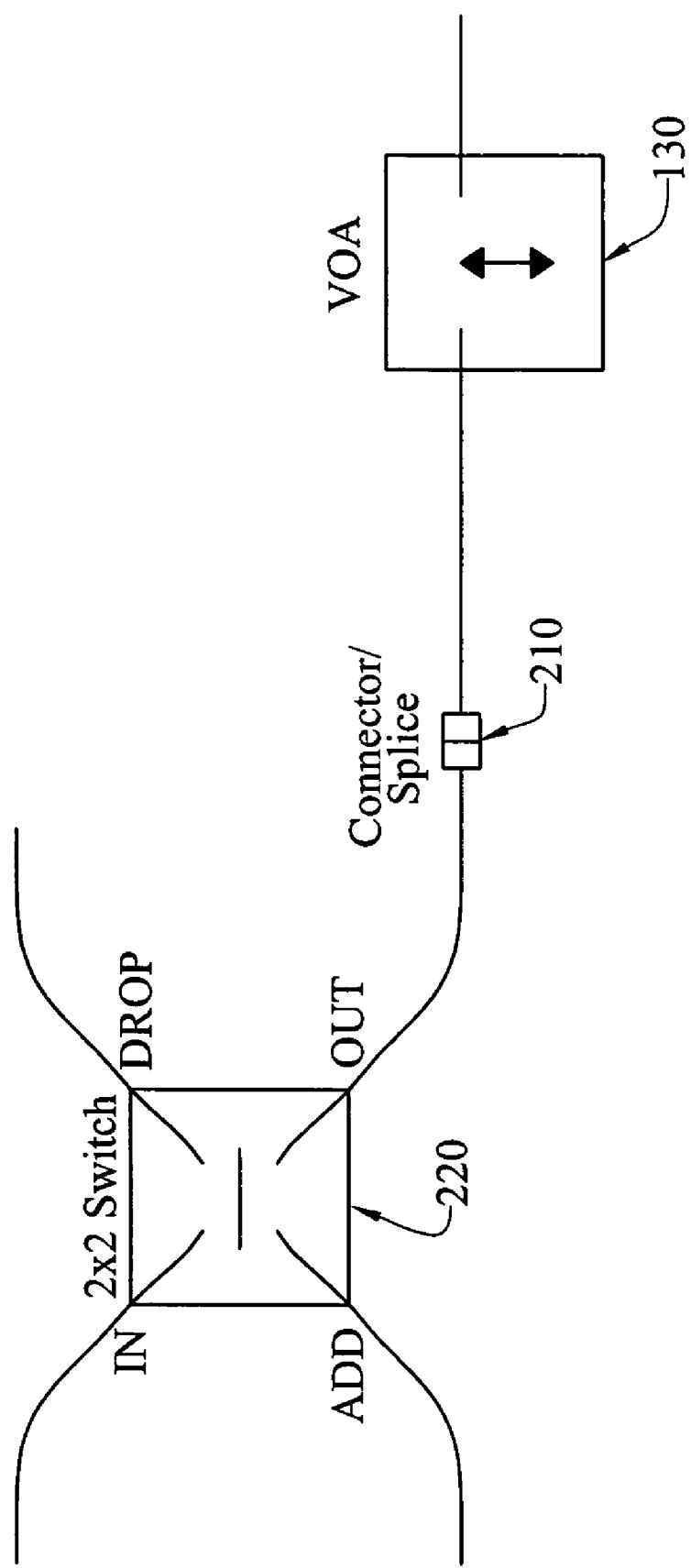
FIG. 2 is a block diagram illustrating a 2×2 switch and VOA implementation.

Before beginning a detailed description of the subject invention, mention of the following is in order. When appropriate, like reference numerals and characters are used to designate identical, corresponding, or similar components in differing drawing figures. Furthermore, in the detailed description to follow, example sizes/models/value/ranges may be given, although the present invention is not limited thereto. Still furthermore, any clock or timing signals in the drawing figures are not drawn to scale but rather, exemplary and critical time values are mentioned when appropriate. When specific details are set forth in order to describe an example or embodiment of the invention, it should be apparent to one skilled in the art that the invention can be practiced with, or without, variations of these specific details. Lastly, it should be apparent that differing combinations of hard-wired control circuitry and software instructions may be used to implement embodiments of the present invention; that is, the present invention is not limited to any specific combination of hardware and software.

Figure 3:
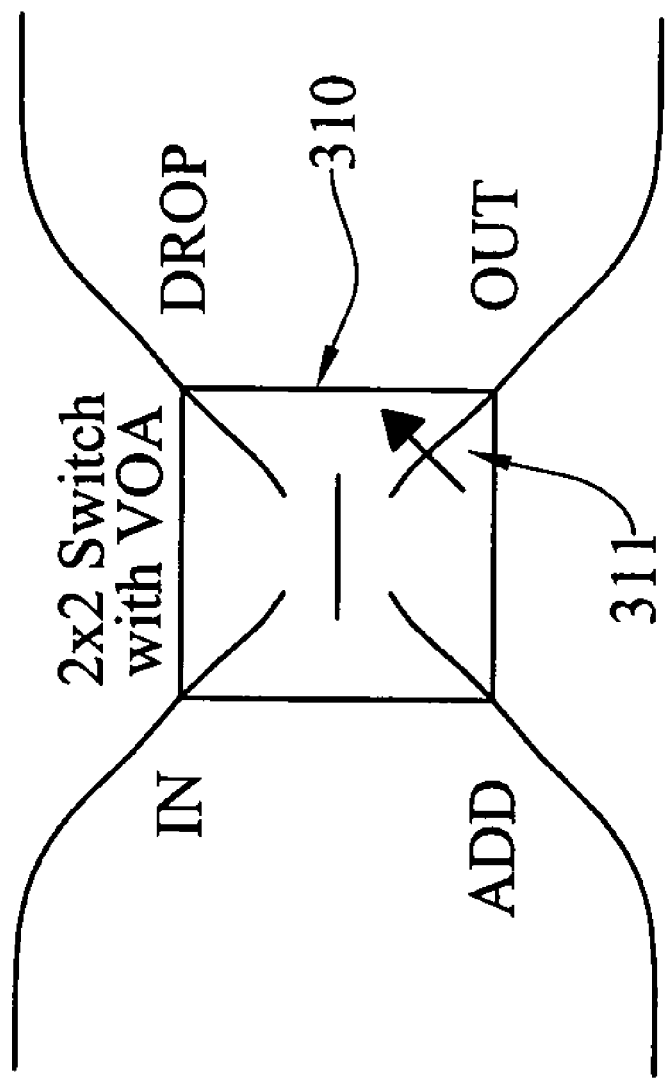
FIG. 3 schematically illustrates an SVOA.

FIG. 3 schematically illustrates an SVOA 310. In such an SVOA, a VOA 311, which is integrated with a 2×2 optical switch, is located upstream of the switch output OUT. It is to be noted that both the switch and the VOA 311 can be actuated by either electrostatic or thermal MEMS actuators, for example. These actuators have been omitted from some of the drawing figures for the sake of clarity. Furthermore, it is noted that the switch may be a bistable switch, that is, the switch may be latched in either a blocking or non-blocking mode.

Figure 4:
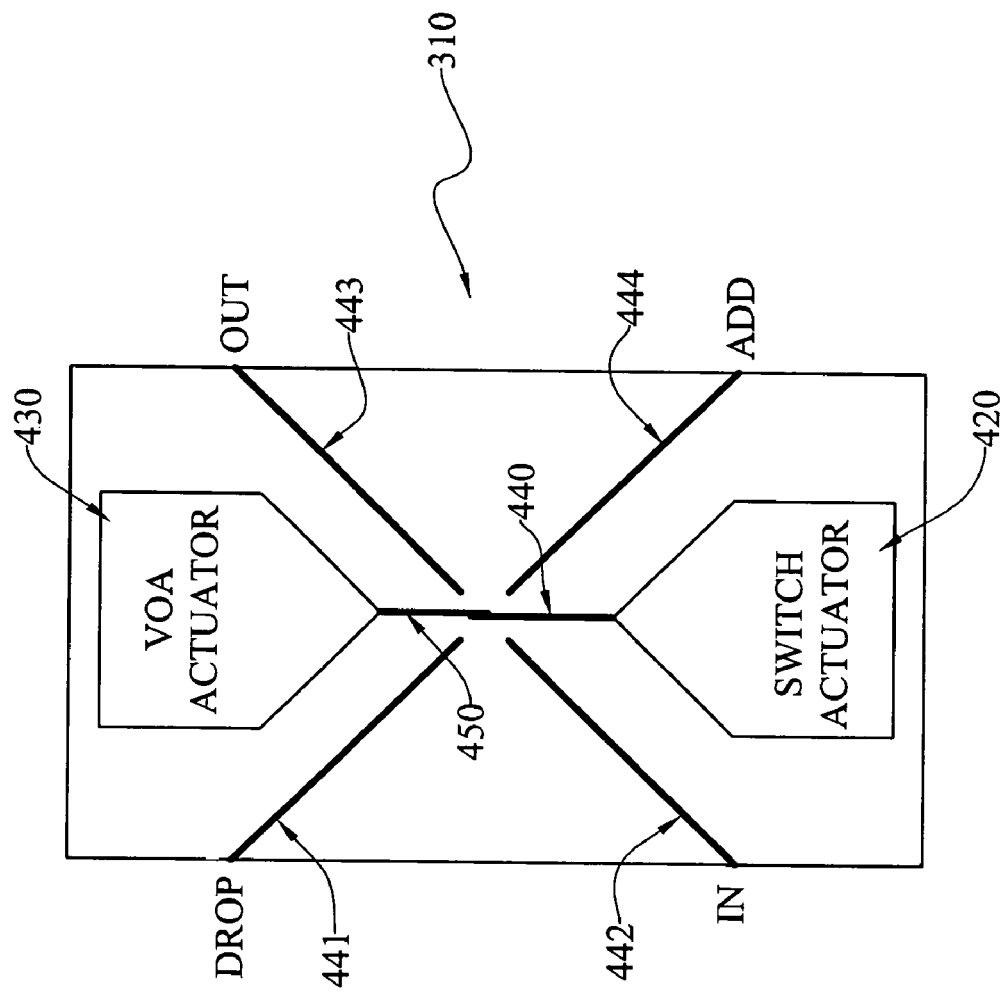
FIG. 4 illustrates an SVOA in accordance with an example embodiment of the present invention.

As illustrated in FIG. 4, one possible arrangement for an SVOA 310 is to combine a MEMS switch with an optical attenuation vane 450 on the output side thereof. One switch design, having a switch actuator 420 and a VOA actuator 430, uses a lensed fiber, for example, to collimate and transmit light across an air gap to another lensed fiber. A mirror blade 440 located between the fibers can be used to redirect the light to a third fiber. If sufficient room is provided between the face of the output fiber and the mirror blade 440, it is possible to locate an attenuator vane 450 therebetween to block part of the light and thereby effect attenuation. The VOA actuator 430 moves the attenuator vane 450 so as to control the amount of attenuation. The IN terminal is at the end of fiber 442, the DROP terminal is at the end of fiber 441, the OUT terminal is at the end of fiber 443, and the ADD terminal is at the end of fiber 444. The switch actuator 420 selectively moves the mirror blade 440 so as to optically connect either the IN terminal with the OUT terminal, or the ADD terminal with the OUT terminal.

Figure 5:
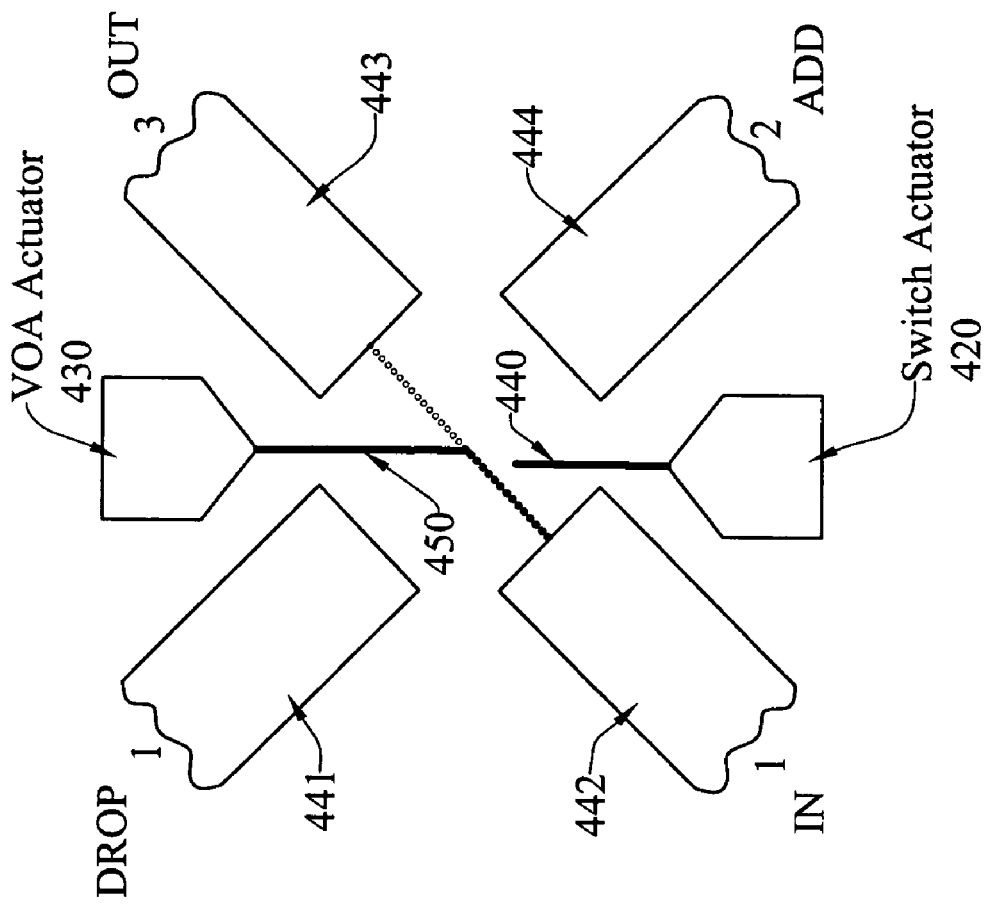
FIG. 5 Illustrates a pass-through switch operation with optical attenuation of an SVOA in accordance with an example embodiment of the present invention.

FIG. 5 illustrates a pass-through switch operation with optical attenuation of an SVOA in accordance with an example embodiment of the present invention. As clearly illustrated in FIG. 5, the mirror blade 440 is out of the way, thereby allowing light to pass across the air gap from fiber 442 to fiber 443. The attenuator vane 450 partially blocks the passage of light across the air gap and may be incrementally moved, thus providing different levels of attenuation in accordance with the amount of light being blocked.

Figure 6:
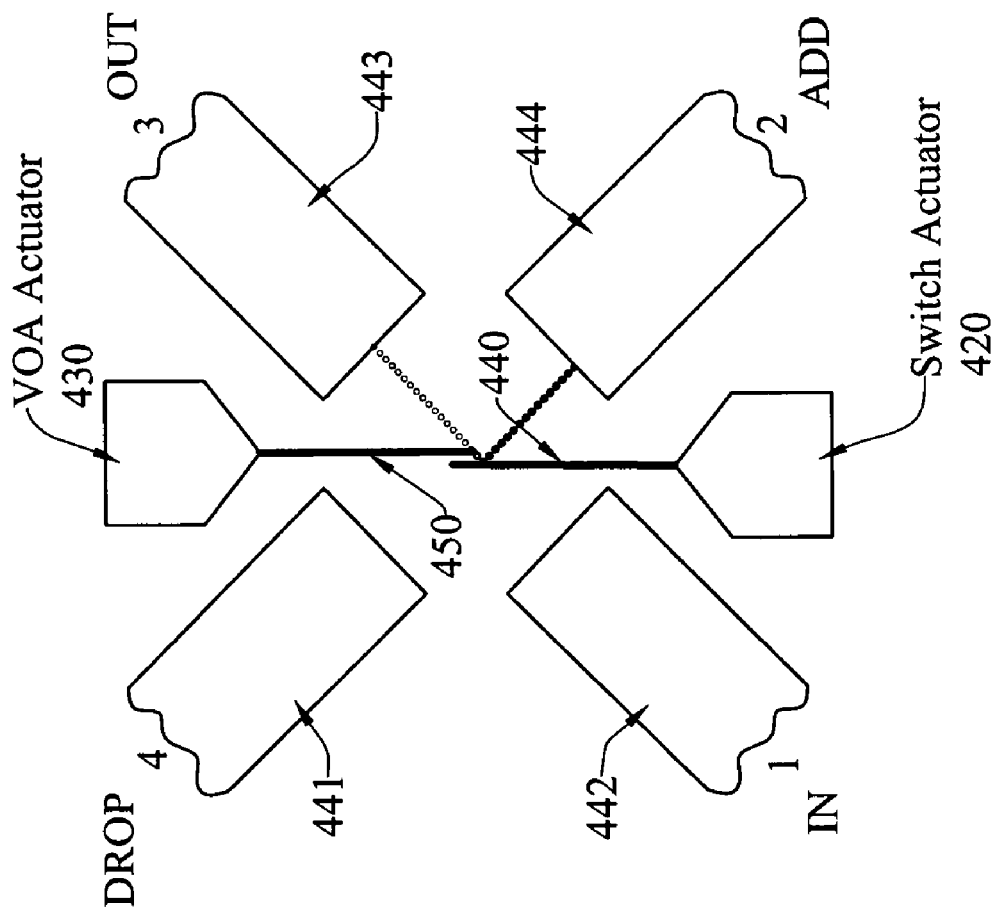
FIG. 6 illustrates a blocking function of a switch with optical attenuation of an SVOA in accordance with an example embodiment of the present invention.

FIG. 6 illustrates a blocking function of a switch with optical attenuation of an SVOA in accordance with an example embodiment of the present invention. As clearly illustrated in FIG. 6, light is inputted into the air gap by fiber 444 and is reflected by the mirror blade 440 into fiber 443. The attenuator vane 450 still partially blocks the passage of light across the air gap so as to still provide different levels of attenuation in accordance with the amount of light being blocked.

Figure 7:
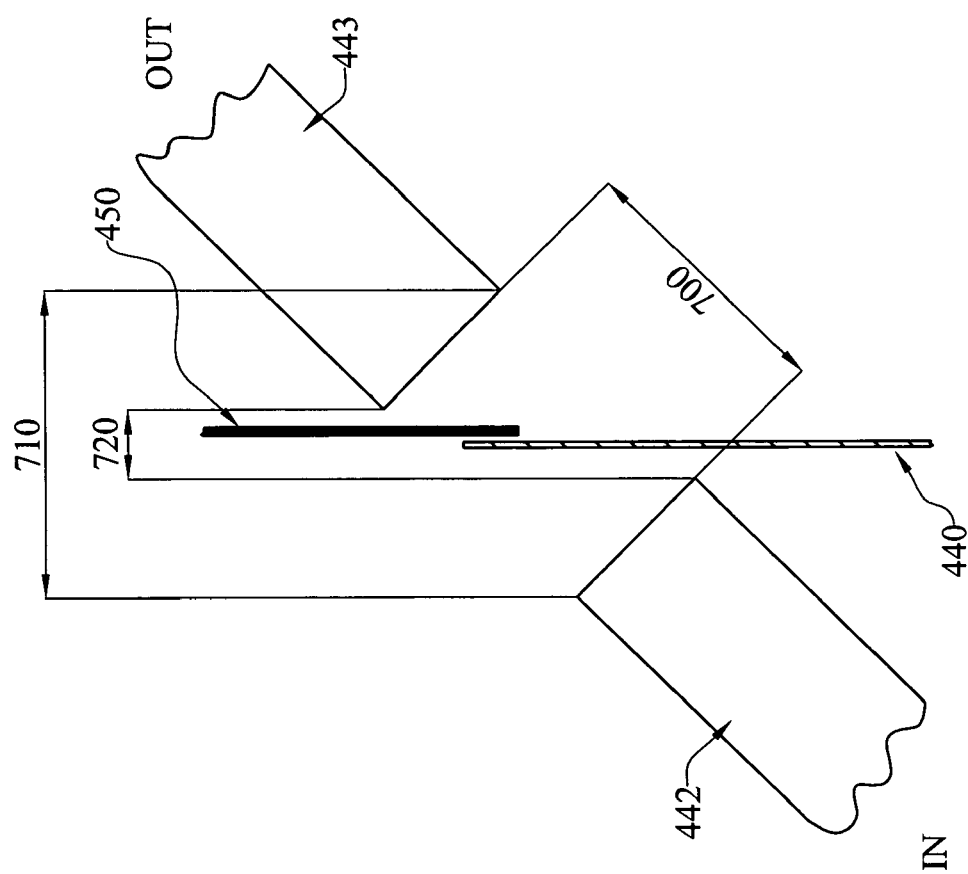
FIG. 7 illustrates component spacing of an SVOA in accordance with an example embodiment of the present invention.
Figure 8:
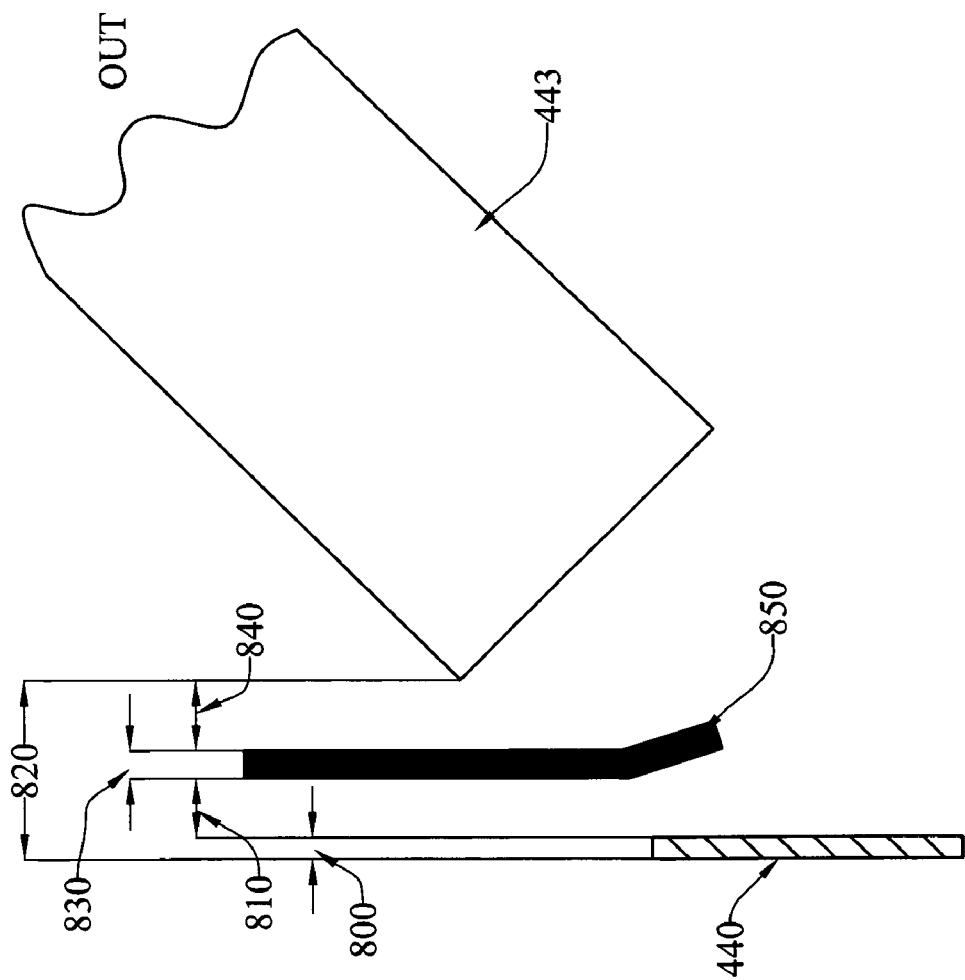
FIG. 8 illustrates a component spacing detail of the SVOA of FIG. 7.

FIG. 7 illustrates exemplary component spacing of an SVOA in accordance with an example embodiment of the present invention, and FIG. 8 illustrates a component spacing detail of the SVOA of FIG. 7. For example, as illustrated in FIG. 7, the distance across the air gap 700 may be on the order of 200 microns, while the horizontal distance 710 between distant corners of the fibers 442 and 443 may be on the order of 230 microns, and the horizontal distance 720 between adjacent proximate corners of the fibers 442 and 443 may be on the order of 53 microns.

Similarly, as illustrated in FIG. 8, the horizontal width 800 of half the mirror blade 440 may be on the order of 1.5 microns. The horizontal width 830 of the attenuator vane 850, which includes a bent portion to improve back-reflection, may be on the order of 5 microns. The horizontal distance 810 between the mirror blade 440 and the attenuator vane 850 may be on the order of 10 microns and the distance 840 between the attenuator vane 850 and the face of the fiber 443 may also be on the order of 10 microns. Furthermore, the distance 820 between the centerline of the mirror blade 440 and the corner of the fiber 443 may be on the order of 26.5 microns.

Figure 9:
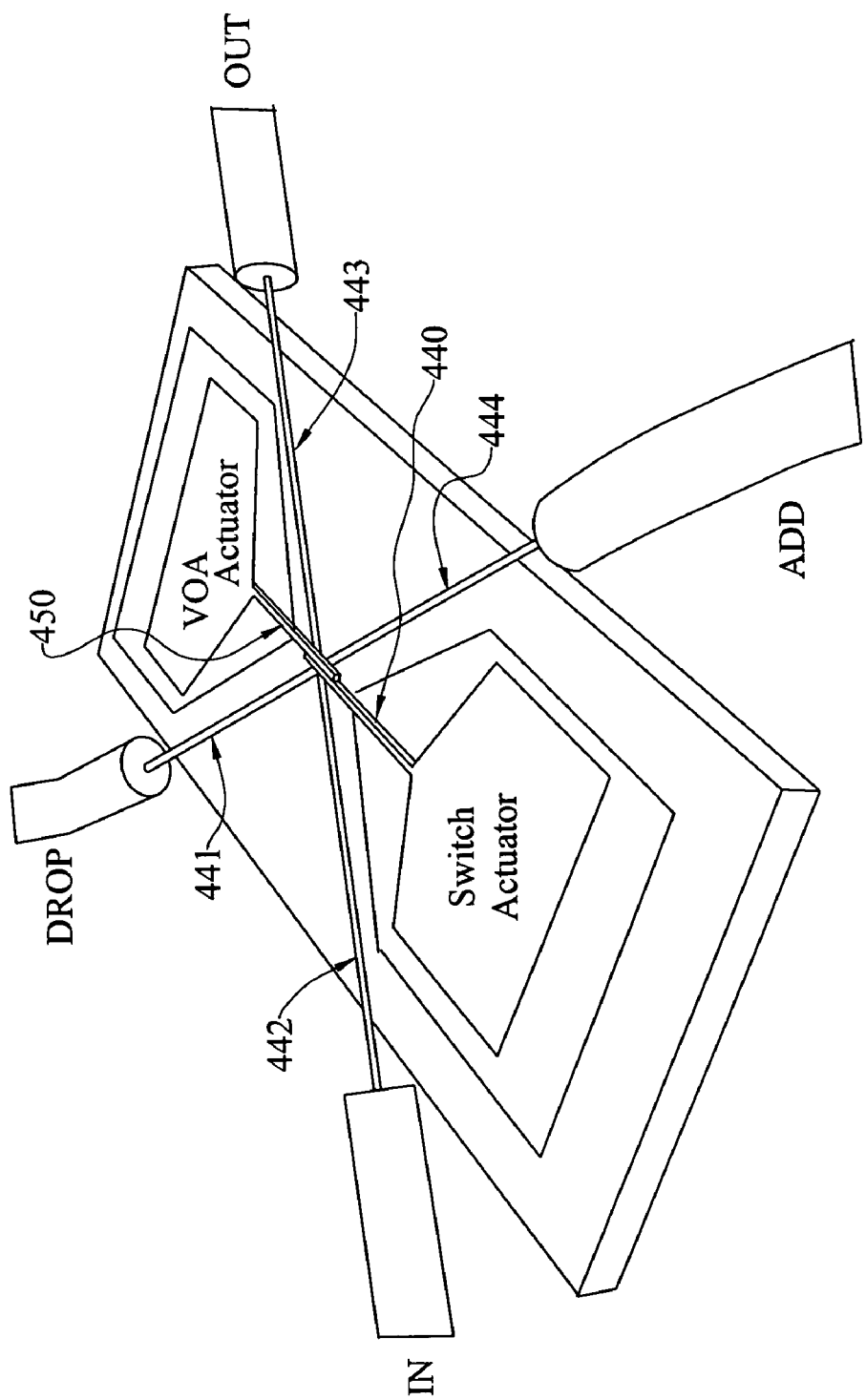
FIG. 9 is a three-dimensional block view of an SVOA in accordance with an example embodiment of the present invention.

FIG. 9 is a schematic perspective view of an SVOA in accordance with an example embodiment of the present invention. By including both a switch and a variable optical attenuator on the same chip die (e.g., a silicon substrate), the overall size can be reduced significantly as compared with a switch and a variable optical attenuator on separate chip dies. Because of this, any chip layout currently designed for the switch alone, could be readily expanded to accommodate the added variable optical attenuator. This is particularly important in the case of multi-device modules, where, for example, sixteen SVOAs might have substantially the same footprint as sixteen switches by themselves. Furthermore, if the operating voltages for the SVOAs are low enough, a microprocessor and D/A (Digital/Analog) converter might be included in the same package so as to provide a completely digital interface. This is not to preclude the use of the inventive SVOA in other applications.

This concludes the description of the example embodiment. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangements within the scope of the foregoing disclosure, the drawings, and the appended claims without departing from the spirit of the invention. In additions to variations and modifications in the component parts and/or arrangements, alternative uses will also be apparent to those skilled in the art.

What is claimed is:

1. A combined Switch/Variable Optical Attenuator (SVOA), comprising:
    a die;
    an optical switch mounted on said die, said switch having at least tree ports between which optical signals may be transmitted;
    a single air gap between said ports;
    said switch having a mirror blade mounted for controlled movement in said air gap to selectively direct the propagation path of optical signals transmitted through said air gap from one of said ports to another of said ports; and
    a variable optical attenuator mounted on said die and having an attenuator vane mounted for controlled movement in said air gap, said attenuator vane being operatively arranged to selectively attenuate optical signals transmitted through said air gap in said propagation path independently of the position of said mirror blade in said air gap.

2. An SVOA as set forth in claim 1 wherein a plurality of said switches and a like plurality of said attenuators are mounted on said die, with each attenuator being operatively associated with a respective one of said switches.

3. An SVOA as set forth in claim 1 wherein said switch is an optical MEMS switch.

4. An SVOA as set forth in claim 1 wherein said attenuator is an MEMS variable optical attenuator.

5. An SVOA as set forth in claim 1 wherein said switch is a 2×2 optical switch having an INPUT port, an OUTPUT port, an ADD port and a DROP port, said INPUT port communicating with said OUTPUT port in one state of said switch and said ADD port communicating with said OUTPUT port in a second state of said switch.

6. An SVOA as set forth in claim 1 wherein said optical signal is transmitted by free space propagation through said air gap between said ports.

7. An SVOA as set forth in claim 1 wherein there are no connectors or fusion splices in the optical path between said ports.

8. An SVOA as set forth in claim 1, and further comprising:
    a switch actuator mounted on said die; and
    wherein the position of said mirror blade is controlled by said switch actuator such that said propagation path is a function of the position of said mirror blade in said air gap.

9. An SVOA as set forth in claim 1, and further comprising:
    an attenuator actuator mounted on said die; and
    wherein the position of said attenuator vane is controlled by said attenuator actuator such that the degree of light attenuation in said propagation path is a function of the position of said attenuator vane in said air gap.

10. A method of manufacturing a combined Switch/Variable Optical Attenuator (SVOA), comprising the steps of:
    providing a die;
    fabricating an optical switch on said die, said switch having at least three ports between which optical signals may be transmitted, there being a single air gap between said ports, said switch having a mirror blade mounted for controlled movement in said air gap to selectively direct the propagation path of said optical signals through said air gap from one of said ports to another of said ports; and
    fabricating a variable optical attenuator on said die, said attenuator having an attenuator vane mounted for controlled movement in said air gap, said attenuator vane being operatively arranged to selectively attenuate optical signals transmitted through said air gap in said propagation path independently of the position of said mirror blade in said air gap;
    thereby to provide a combined SVOA that is less lossy than if said switch and said attenuator were provided as separate elements.

11. A Reconfigurable Optical Add Drop Multiplexer (ROADM), comprising:
    an optical demultiplexer operatively arranged to receive a first multiplexed optical signal and to output a plurality of demultiplexed individual optical signals;
    a Switch/Variable Optical Attenuator (SVOA) operatively arranged to receive the plurality of demultiplexed individual optical signals from said optical demultiplexer and to selectively output a plurality of selectively switched and attenuated optical signals said SVOA including a die; an optical switch mounted on said die, said switch having at least three ports between which optical signals may be transmitted; a single air gap between said ports; said switch having a mirror blade mounted for controlled movement in said air gap to selectively direct the propagation path of said optical signals transmitted through said air gap from one of said ports to another of said ports; and
    a variable optical attenuator mounted on said die, said attenuator having an attenuator vane mounted for controlled movement in said air gap, said attenuator vane being operatively arranged to selectively attenuate optical signals transmitted through said air gap in said propagation path independently off the position of said mirror blade in said air gap; and an optical multiplexer operatively arranged to receive said optical signals from said SVOA and to output a second multiplexed optical signal.

12. The method of manufacturing a Reconfigurable Optical Add Drop Multiplexer (ROADM), comprising the steps of:
providing an optical demultiplexer operatively arranged to receive a first multiplexed optical signal and to output a plurality of demultiplexed individual optical signals;
providing a Switch/Variable Optical Attenuator (SVOA) operatively arranged to receive the plurality of demultiplexed individual optical signals from said optical demultiplexer and to selectively output a plurality of selectively switched and attenuated optical signals, said SVOA including a die; an optical switch mounted on said die, said switch having at least three ports between which optical signals may be transmitted; a single air gap between said ports; said switch having a mirror blade mounted for controlled movement in said air gap to selectively direct the propagation path of optical signals transmitted through said air gap from one of said ports to another of said ports; and a variable optical attenuator mounted on said die and, said attenuator having an attenuator vane mounted for controlled movement in said air gap, said attenuator vane being operatively arranged to selectively attenuate optical signals transmitted through said air gap in said propagation path independently of the position of said mirror blade in said air gap;
providing an optical multiplexer operatively arranged to receive said optical signals from said SVOA and to output a second multiplexed optical signal.

* * * * *